Figure 1:
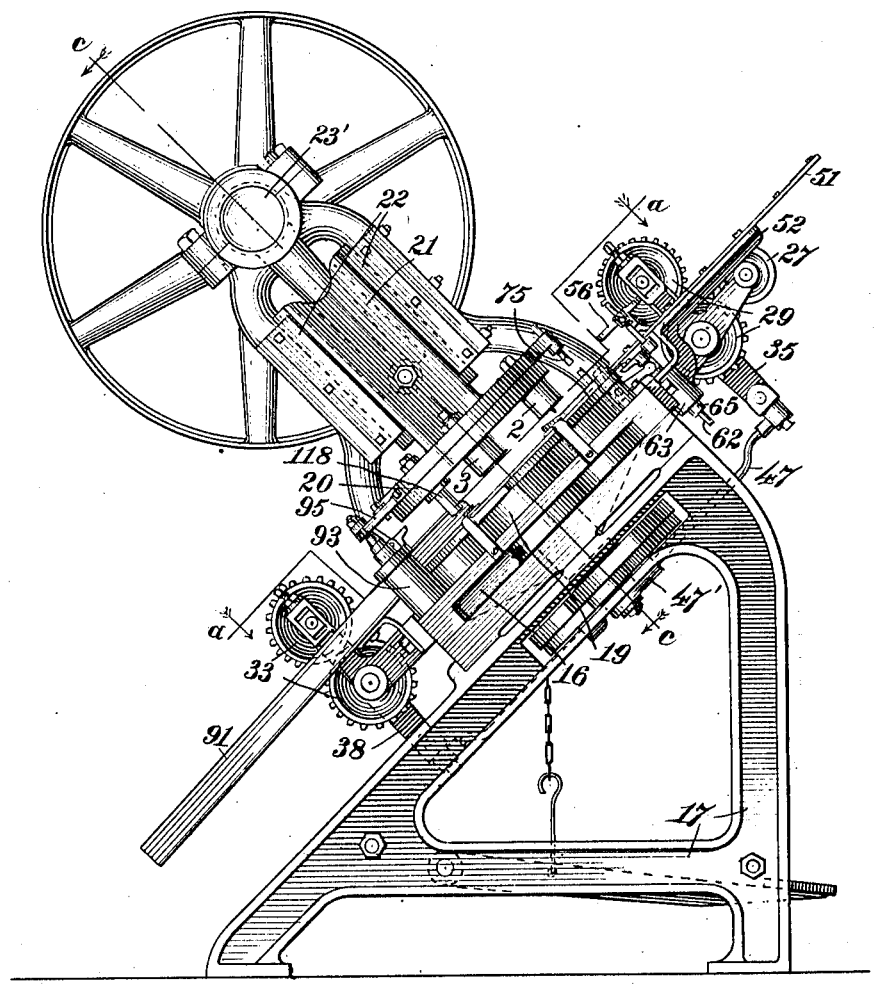

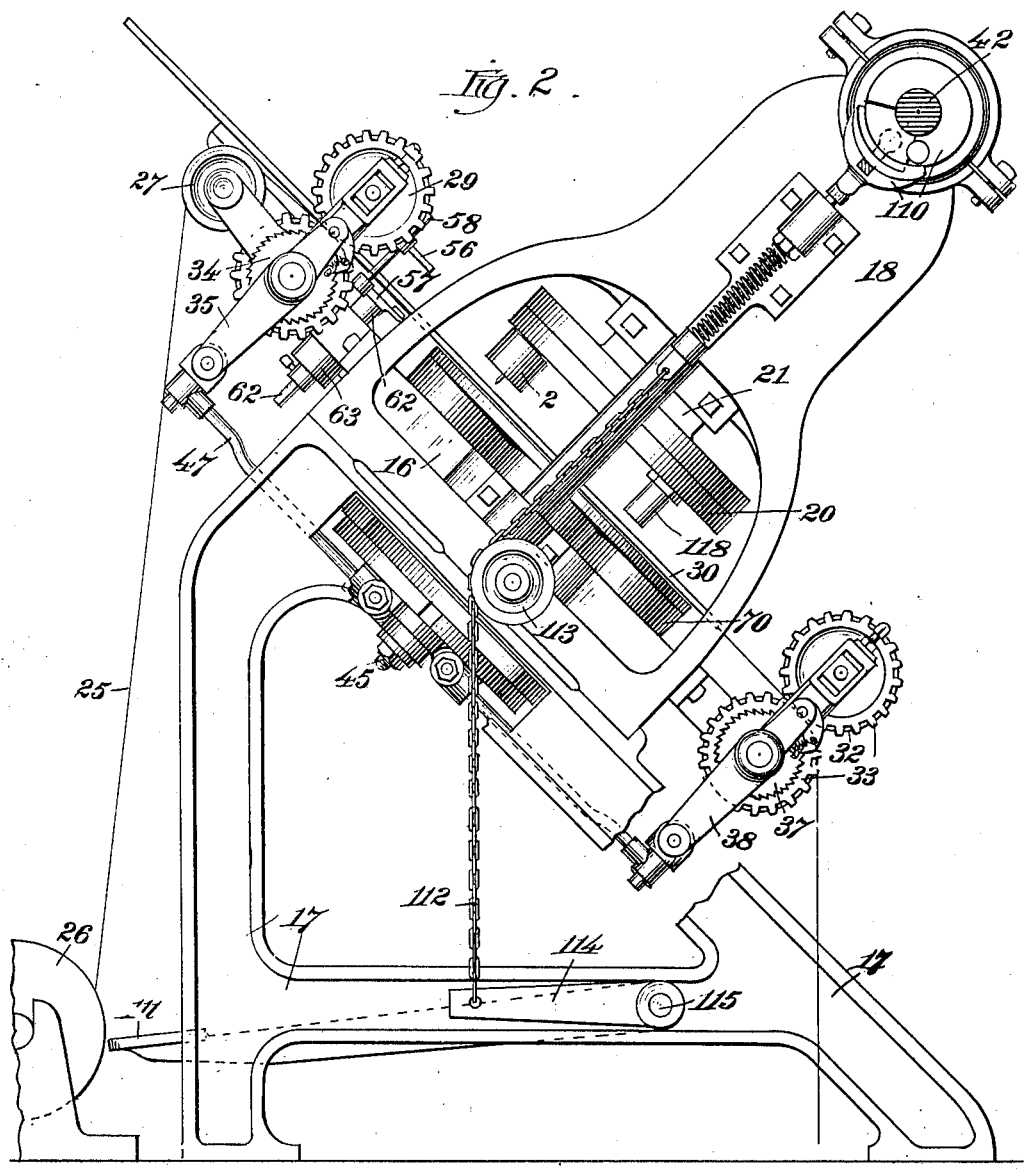

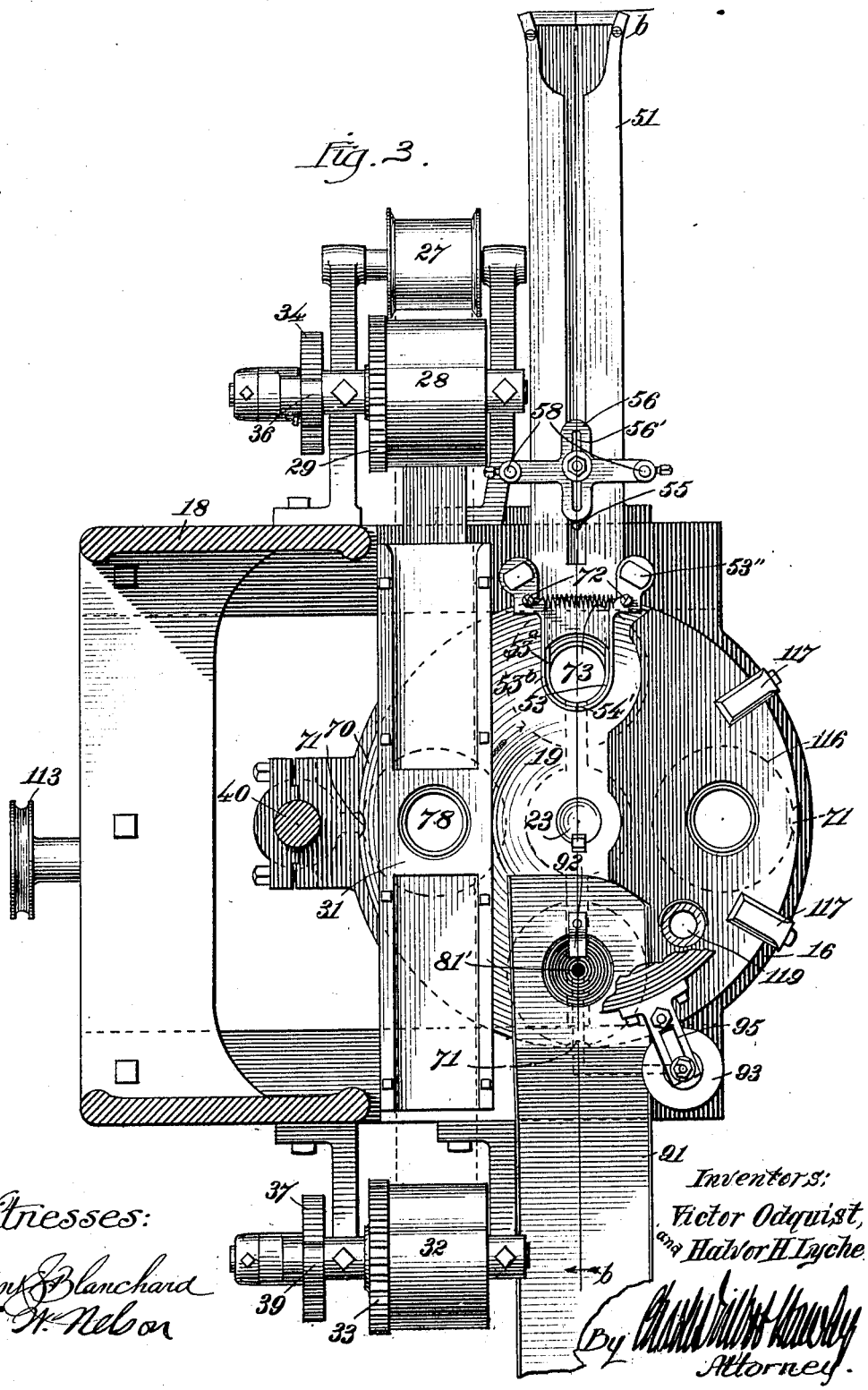

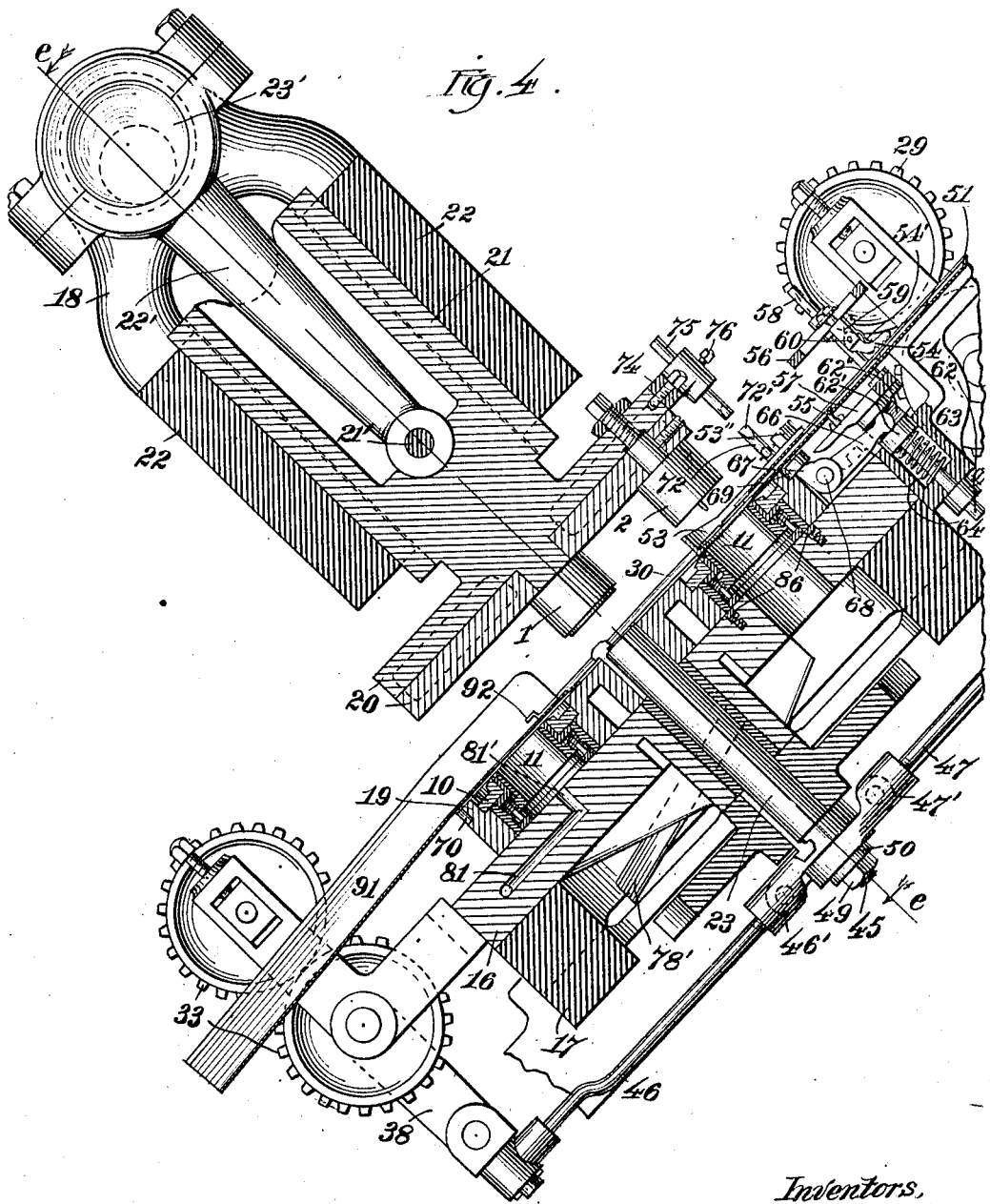

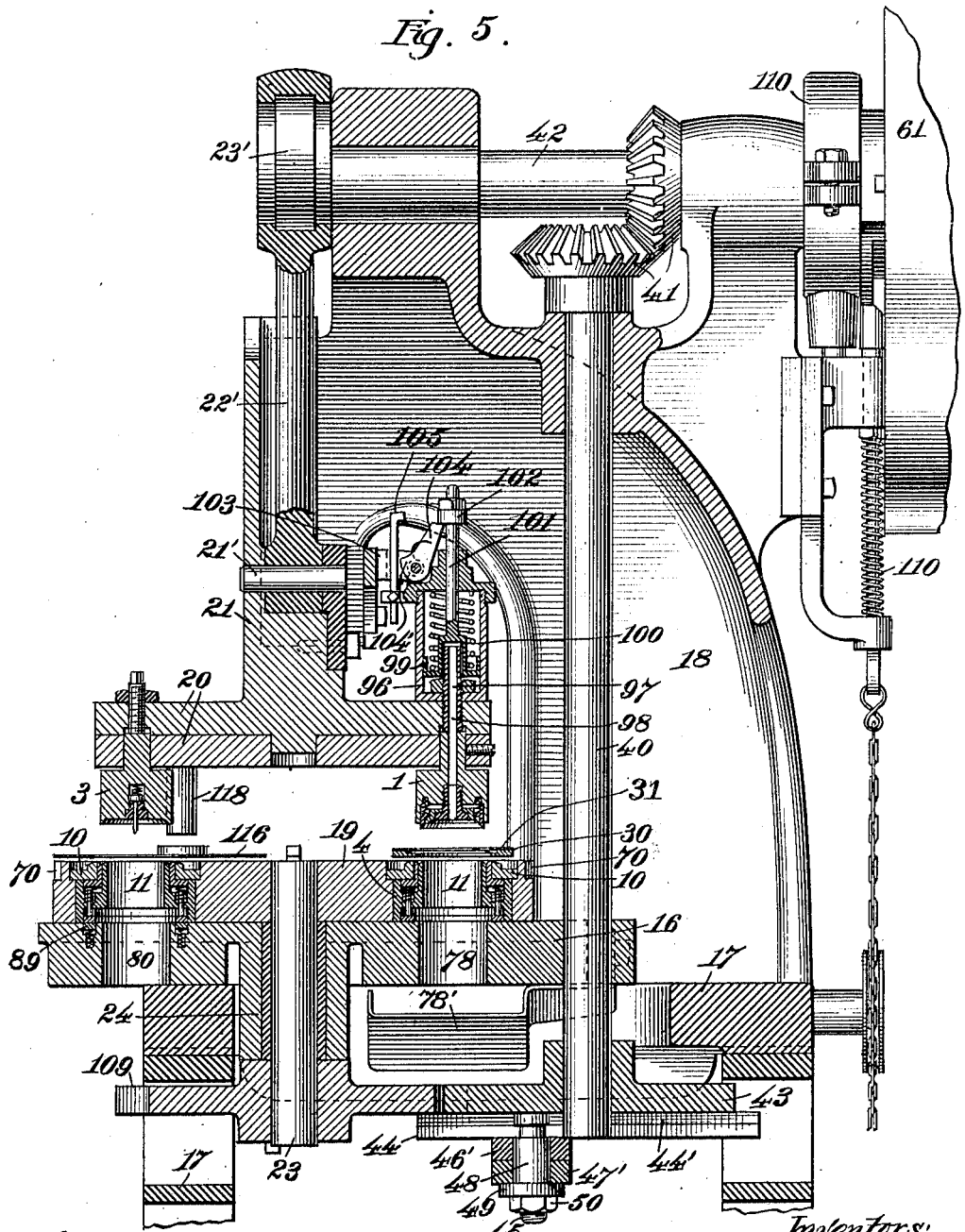

V. ODQUIST & H. H. LYCHE.
CAN CAP HEMMER.
APPLICATION FILED SEPT. 4, 1906.
970,539.
Patented Sept. 20, 1910.
8 SHEETS—SHEET 6.
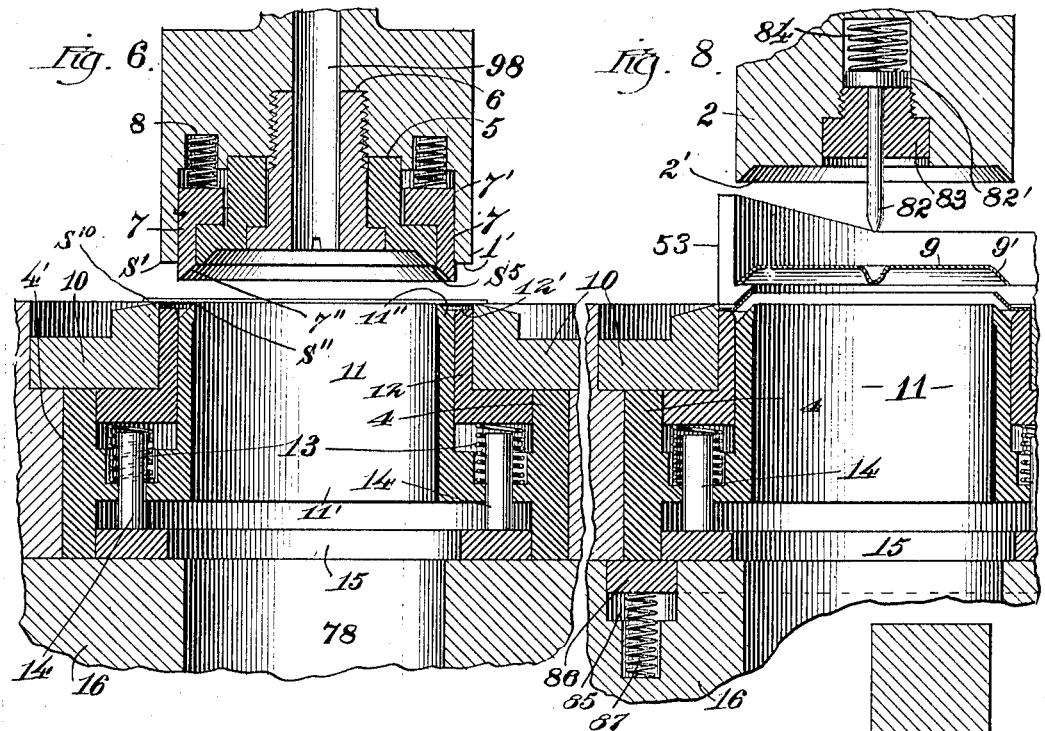
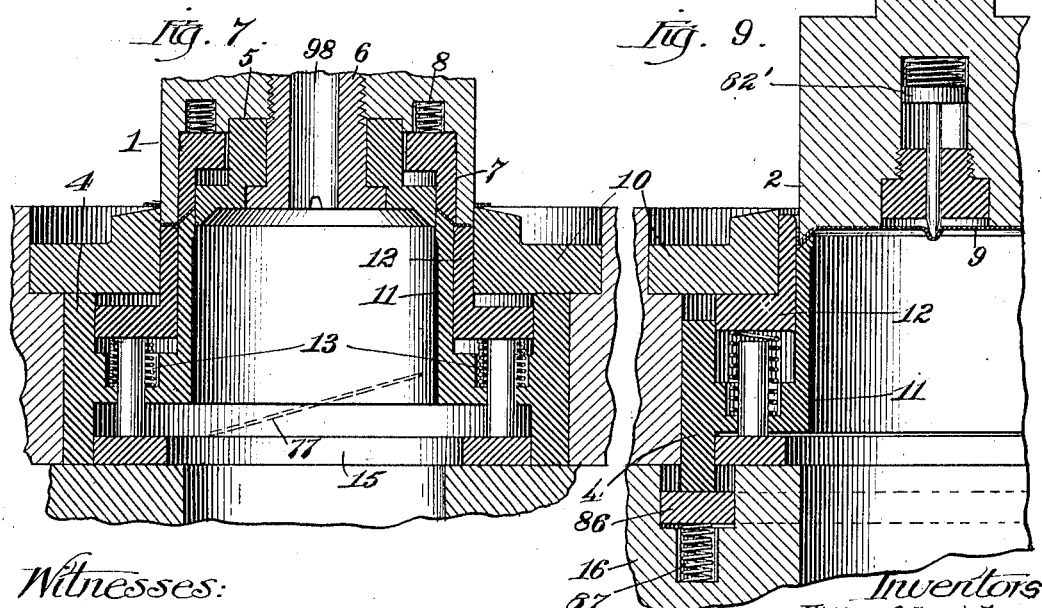
Witnesses:
Frank Blanchard
A. W. Nelson
Inventors
Victor Odquist
and Halvor H. Lyche
By
Attorney

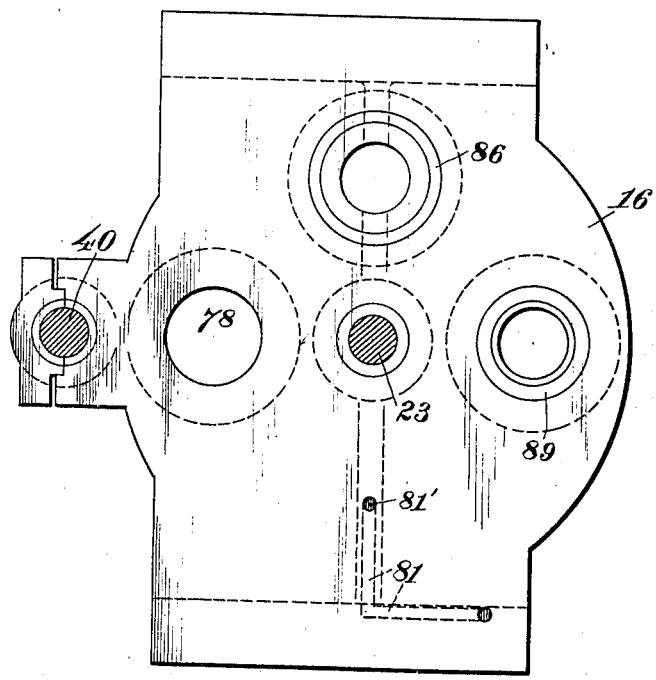

V. ODQUIST & H. H. LYCHE.
CAN CAP HEMMER.
APPLICATION FILED SEPT. 4, 1906.
970,539.
Patented Sept. 20, 1910.
8 SHEETS—SHEET 8.
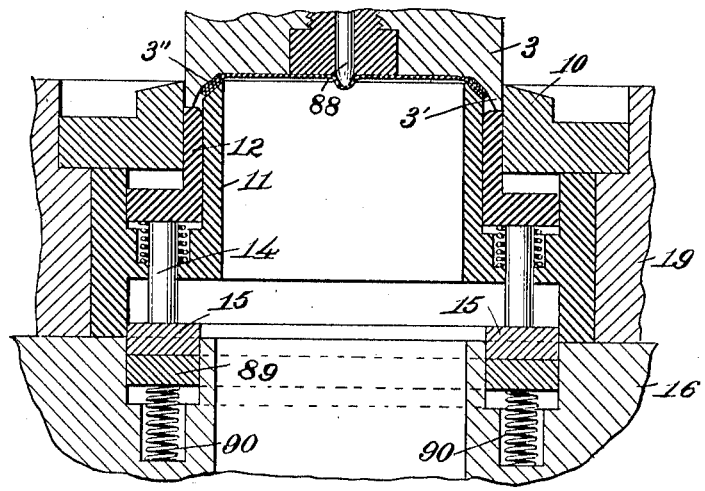
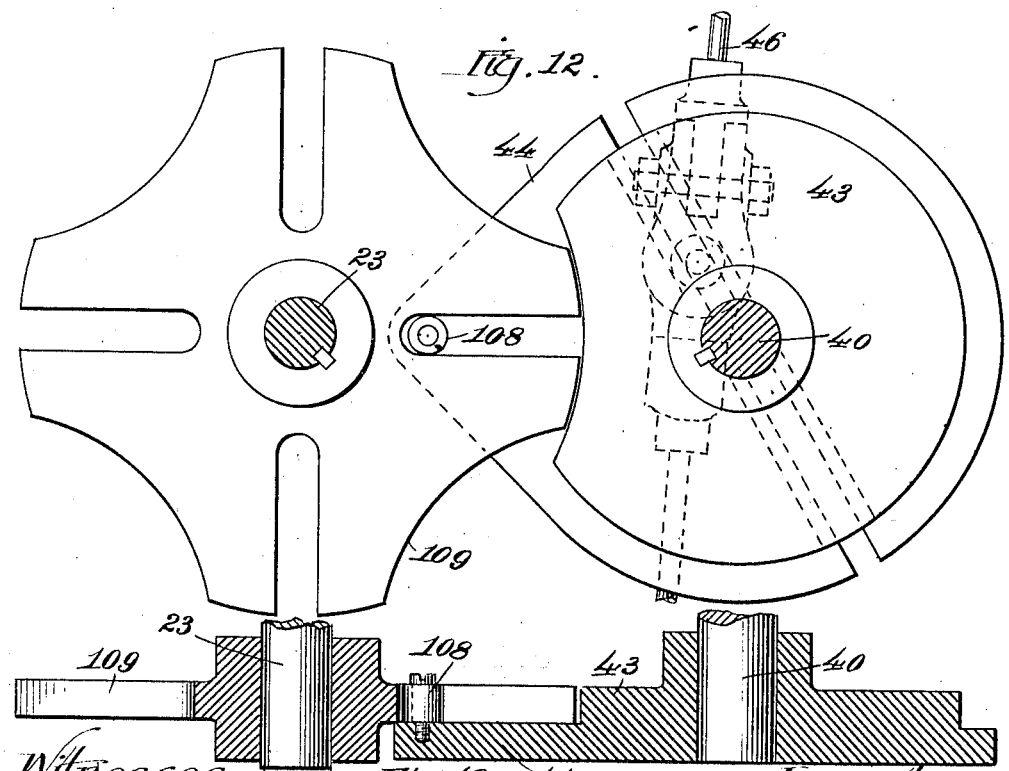

UNITED STATES PATENT OFFICE.

VICTOR ODQUIST AND HALVOR HEYERDAHL LYCHE, OF CHICAGO, ILLINOIS, ASSIGNORS TO TORRIS WOLD & COMPANY, OF CHICAGO, ILLINOIS, A CORPORATION OF ILLINOIS.

CAN-CAP HEMMER.

970,539. Specification of Letters Patent. Patented Sept. 20, 1910.

Application filed September 4, 1906. Serial No. 333,155.

*To all whom it may concern:*

Be it known that we, VICTOR ODQUIST and HALVOR HEYERDAHL LYCHE, citizens of the United States, and both residents of Chicago, county of Cook, and State of Illinois, have invented a certain new, useful, and Improved Can-Cap Hemmer, of which the following is a full, clear, and exact description, such as will enable others skilled in the art to which it appertains to make and use the same.

Our invention relates to can-making machinery, and particularly relates to can-cap hemmers; the latter being the technical name for machines which automatically apply a ring of cold solder to the periphery of a metal can-cap by hemming or lapping the solder ring over the rim of the cap upon both sides thereof, thus making the cap ready for soldering to the head of a metal can. These caps are usually provided with inclined flanges, and the can-head with similar flanges. The caps are soldered thereon by the application of suitable heating means that melts the solder.

The object of our invention is to provide a can-cap hemmer that will hem caps of various sizes; that will operate with great speed (so as to be capable of hemming several thousands of caps per hour) and which will cut its own rings of solder from a strip of sheet solder supplied thereto.

Our invention consists generally in a can-cap hemmer comprising entirely automatic and coöperating mechanisms for feeding the caps to be hemmed, for feeding a ribbon of solder, for cutting rings of solder from said ribbon, for placing caps upon the solder rings, for hemming said rings upon the caps, and for expelling the hemmed caps from the mechanism.

The invention further consists in simultaneously acting dies which cut and shape the solder rings and attach them to the caps, each of said dies having its own distinct function; the arrangement being such that they are all actuated by one movement of the machine, and a plurality of caps are operated upon at every stroke of the die-holder.

The invention further consists in a die, or pair of dies, adapted to punch a ring of solder from a flat strip and to form in said ring an annular groove, thereby preparing the ring to receive a flanged cap; the construction being such that the punching and forming operations are effected by one stroke of the die.

The invention further and particularly consists in the combination of a plurality of simultaneously active dies, adapted to perform different operations, with a carrier provided with receptive dies each adapted to receive a solder ring and cap, and mechanism for intermittently operating said carrier whereby the receptive dies are presented to the active dies in sequence.

Further and particularly the invention consists in certain devices for pneumatically expelling the solder waste and the hemmed caps from the receptive dies, following the punching of the solder rings and the hemming of the caps, respectively.

Further and particularly the invention consists in novel means for applying the caps to the solder rings when the latter have been grooved to receive them. And further the invention consists in a novel device for feeding the caps singly to the applying means just referred to. And further the invention consists in certain devices for causing and adjusting the intermittent feed of the strip solder; and further the invention consists in certain organizations of parts and in various details of construction, all as hereinafter described, and particularly pointed out in the claims.

Our invention will be more readily understood by reference to the accompanying drawings, forming a part of this specification, and in which;

Figure 1, is a side elevation of a cap-hemming machine embodying the invention; Fig. 2, is an enlarged elevation of the opposite side, omitting the pulley; Fig. 3, is an enlarged detail view on dotted line *a—a* of Fig. 1, showing also a portion of the plunger-head; Fig. 4, is a vertical sectional view on dotted line *b—b* of Fig. 3; Fig. 5 is an enlarged sectional view on dotted line *c—c* of Fig. 1 or *e e* of Fig. 4, showing the clutch and pulley in elevation; Figs. 6, 7, 8, 9, and 10, are detail sectional views illustrating the steps of the solder-cutting and cap-hemming operations; Fig. 11, is a plan view of the plate that underlies the carrier; Fig. 12, is an enlarged plan of the intermittent carrier-actuating mechanism, and Fig. 13 is a vertical section of the same.

The frame of the machine comprises a pair of triangular base castings, 17, and an arch or yoke, 18, the base of which is bolted to the inclined portion of the frame that connects the inclined portions of the base castings, 17. The arch, 18, supports the power shaft and guides a plunger which holds the active die-members. The base portion or main frame supports a rotative carrier, 19, which holds the receptive die members that coöperate with said active die members to cut and shape the rings of solder, carry them from one stopping point to another, and hold the caps while the solder rings are finally crimped thereon. Certain brackets held by the main frame, support the automatic solder-feeding mechanisms which draw the ribbon of solder across the said carrier or die-holding plate, in line with the punching and initial forming dies. The active die members hereinafter described are all held by a plunger-head, 20, made integral with a cross-head, 21, that is held between rigid guides, 22, formed by the arch, 18. The plunger and cross head are reciprocated preferably by a pitman, 22', connected to the cross head pin 21', and actuated by an eccentric, 23', on the power shaft, 42, on which is keyed the drive-pulley, 61. There are three active plungers or die members, 1, 2, and 3; mounted 90 degrees apart upon the lower surface of the plunger-head, 20. Two of these die members are shown in Fig. 4, and the other is shown at the left in Fig. 5. Thus two of these die members are directly opposite each other, with the third one located halfway between them. The receptive and coacting die members, 10, are mounted in recesses in the cap carrier, 19, which recesses are spaced 90 degrees apart, as will be seen by reference to Fig. 3. The plunger die, 1, which acts first, punches the rings of solder from a strip or sheet of that material and partly forms said rings for their attachment to the can caps. The solder ring is then carried in line with the second plunger die, 2, and beneath the cap-releasing device; this die deposits the caps upon the solder rings and strikes up a flange thereon. The cap and ring are then carried into the path of the third plunger die, 3, which completes the hemming of the solder ring upon the cap. In these operations the receptive die that carries the ring and the cap, coöperates with the active dies in succession. The cap carrier and lower die holder, 19, is keyed upon a shaft, 23, journaled in a bearing, 24, integral with a stationary plate, 16, secured to the main frame, 17. Plate, 16, supports the carrier, 19, as shown.

The mechanism shown in the drawings for feeding the ribbon of sheet solder will now be described.

The strip of solder, 25, is led into the machine from a suitable reel, 26, and first passes over a roller, 27, that is arranged adjacent to a pair of drawing-in rolls, 28, geared together by cog-wheels, 29. The strip then passes through an inclined guideway, 30, disposed in a plane parallel to that of the carrier and extending across the face of the carrier directly over one of the die-members therein. The upper side of this guideway is open except for a square plate, 31, having a circular opening large enough to admit the active die member hereinafter described. As shown in Fig. 5, the bottom of the guideway supports the ribbon excepting directly over the die member of the carrier, where it is provided with a circular opening. From said guideway the solder strip is passed between a pair of drawing-out rolls, 32, geared together by cog-wheels, 33. These rolls are necessary to prevent the solder strip from buckling, in the guideway, there being a tendency thereto caused by the unavoidable friction between the guideway and the strip. The drawing-out rolls also serve to dispose of the waste strip. The drawing-in and the drawing-out rolls are given a step-by-step rotation for feeding the solder strip to the punching die and stopping it during the operation of that die. It is desirable to punch the solder strip with as little waste as possible, and inasmuch as this machine is designed for hemming can-caps of different sizes it would involve a waste of material to feed the solder strip an invariable distance in every case, because when punching out the smaller sized solder rings, webs of solder would remain between the holes in the strip. Aside from economy of material, it is desirable to obtain as many solder-rings as possible from the strip and thus avoid frequent replenishing. Therefore we so construct the mechanism, which actuates the feeding rolls, that the feed will be adjustable in length, to correspond to the size of the caps being hemmed. On the shaft of one of the drawing-in rolls, 28, is a ratchet wheel, 34, and fulcrumed on said shaft is a pawl-lever, 35, that carries an actuating pawl, 36. Likewise one of the drawing-out rolls, 32, is provided with a ratchet wheel, 37, a pawl lever, 38, and an actuating pawl, 39. Referring now to Figs. 5, 12, and 13; a shaft, 40, driven by bevel gears, 41, from the power shaft, 42, carries upon its lower end a wheel consisting of an upper and a lower portion, 43 and 44. The lower portion consists of two separated members, 44, having between them a radial T slot, 44', in which is the head of a bolt, 45, that forms a crank-pin or two contacting rods, 46 and 47. The heads, 46', 47', of said rods are journaled on a collar, 48, rigidly held by the nut, 50, and washer, 49, on the bolt, 45. The opposite ends of said rods are pivotally connected to the pawl-levers, 35 and 38, respectively, as shown in Fig. 2. The continuous rotation of shaft, 40, oscillates the rods 46 and 47, and pawls, 36 and 39, thereby turning the rolls, 28 and 32, simultaneously and equally at each forward stroke of said pawls. The adjustment of the length of feed for the solder strip is effected by adjusting the crank-bolt, 45, radially in the slot, 44'.

The means by which the can-caps are guided and fed one at a time to the die that first receives them will now be described, with special reference to Figs. 3 and 4, of the drawings. 51 indicates an inclined chute, rigidly supported as by a bracket, 52. This chute is constructed to receive and hold a number of caps arranged edge to edge and its lower end is constructed in such manner that the lowermost cap will be normally held thereby while the carrier, 19, is at rest, and will be released by the first part of the rotative movement of said carrier. The device shown performs this operation very efficiently, and comprises a pair of curved cap-holding arms, 53, normally in contact at 54', and pivoted on studs, 53'', together with means for opening said arms at the proper time. Said arms comprise inner flanges, 53ª, that support the face of a cap, and stop flanges, 53ᵇ, that prevent the cap from sliding off them. By reason of overlapping of their edges, the caps are usually jammed together more or less tightly in the chute, and it is therefore necessary to provide, above the arms, 53, an automatic device that shall disengage the lowermost caps from those above them and permit the bottom caps to drop at regular intervals into said arms, 53. These functions are performed by the regularly-timed movements of a rigid frame that carries a push-finger, 54, and a cap-stop, 55, the latter being arranged below the former. Said frame as shown comprises a cross-shaped member, 56, (above the chute) an arm, 57, (below the chute) a pair of rods, 58, connecting said members, (and straddling the chute) and a plunger which carries said frame. The slot, 56', in member, 56, holds, adjustably, the rigid block or lug, 59, upon which the push-finger, 54, is pivoted at 60. The cap-stop, 55, is held by said arm, 57, which projects it up through an opening in the lower side of the chute, 51, while the push-finger, 54, is normally up. As shown, the stop, 55, is releasing one of the caps, 9, while the push-finger, 54, is in position to engage the next higher cap. The plunger, 62, which carries the aforesaid frame is mounted in and guided by a rigidly supported hollow lug, 63, and is provided with a head, 62', in which is a groove or slot, 62''. An expansion spring, 64, pressing upon said head, normally elevates the plunger, the push-finger, and the cap-stop, and an adjustable collar, 65 limits the upward movement of said parts. Their downward movements are caused by a cam-operated bell-crank lever, 66—67, pivoted at 68. Arm, 66, of said lever enters the recess, 62'', of the plunger, 62; the other arm, 67, is provided with a cam-roller, 69, normally resting on a cam surface, 70, on the carrier, 19. The cam which actuates the bell-crank lever, 66—67, is shown in section in Fig. 4, and in plan (partly in dotted lines) in Fig. 3. Said cam, 70, is circular in form except that it is provided at intervals of 90 degrees with recesses or "lows", 71. The roller, 69, being always pressed against the cam by spring, 64, will be moved inwardly when so permitted by the cam recesses, 71; thereby disengaging the push-finger, 54, from one cap and projecting the stop, 55, to check said cap from falling into the arms, 53. As soon as the cam, 70, (which is a part of the carrier, 19) starts again, the cap-stop, 55, will sink through the chute, thus permitting the cap to fall upon the arms, 53; and simultaneously the push-finger, 54, will close in upon the following cap to hold it back until the cam, 70, presents its next low, 71, to roller, 69. We have said that the push-finger, 54, is pivoted. The object of pivoting is to cause it to move slightly upward, while it moves in upon the cap. It is formed with a serrated or frictional surface, as shown, for contact with the cap, and when lifted is restored to normal position with respect to the lug, 59, by a spring, 54'. The upward movement of the finger, serves to disengage the edge of the cap from that of the underlying cap that is checked by the stop, 55, at the moment when said stop retreats. Thus the dropping of the lowermost cap is insured.

Having traced the cap as far as the arms, 53, we will now describe the preferred means for opening said arms at the proper time to drop the caps into the carrier, 19.

It will be observed that said arms are provided with perpendicular pins, 72, having beveled end surfaces, 72', and also that said pins, and therefore said arms, are drawn together by a spring, 73. For acting upon said pins, 72, to separate said arms, the plunger-head, 20, is provided with a pair of brackets, 74, having holes in which are fitted two pins, 75, that have beveled end surfaces, 75', adapted to engage those of the arm-pins, 72. Pins, 75, are preferably adjustable, being held normally by set-screws, 76. It is now obvious that when the plunger-head descends, i. e., moves toward the carrier, 19, its pins, 75, will wedge apart the pins, 72, and the latter will cause the arms, 53, to separate far enough to let the cap, held thereby, drop into one of the carrier-dies; the mechanism being so timed that the carrier comes to rest before the arms, 53, open. The ascent of the plunger-head of course permits the arms, 53, to come together again, ready to receive the next cap.

The dies which punch and form the rings of solder are best shown in Figs. 5 and 6. As shown in Fig. 5, the active member, 1, of the die is held by the plunger-head, 20; while the receptive members, 10, of all the dies are sunk in the rotative carrier, 19. The plunger-die member consists of an outer holding or socket member, 1, an inner annular unyielding member, 5, a screw, 6, holding the latter in position, and a yielding, annular member, 7, emerging between the first-named members. The yielding member, 7, is provided with an inward flange, 7', which is pressed by springs, 8, upon a shoulder of the die member, 5. The inner periphery of member, 7, is beveled, as shown at 7''. The inside member, 5, is also shown as beveled, but is not necessarily so formed. $S^1$ and $S^5$ indicate the shearing edges, which cut a ring from the solder strip when the die descends. The beveled surface of member, 7, coacts with an opposed beveled surface (to be described) to conform the ring to the same sectional shape as the inclined flange, 9', of the can-cap, 9. (See Fig. 8.) The passive or receptive die member, that is held by the carrier, 19, is shown in Fig. 6, beneath the parts just described. It will be remembered that the heavy plate, 16, that underlies the carrier, is in effect a part of the frame. The receptive die members are all constructed the same, and a description of one will suffice for all. The principal members of the receptive die are, a metal ring, 10, having an annular shearing edge, $S^{10}$, an inner member, 11, having a downwardly enlarged bore, 11', and an externally beveled upper edge, 11'', and between said members, a yielding mounted annular member, 12, having a square upper edge, 12'. This edge, 12', coacts with the lower edge, 1', of the active member, 1, and the beveled edge, 11'', coacts with the beveled edge, 7'', of the active member, 7. The yielding member, 12, is pressed up against ring, 10, by springs, 13, and its down stroke is limited by stops, as 14. 15 indicates a ring that is inclosed by a recess in the outer portion, 4, of the receptive die, and supports the stops, 14.

When the plunger-die descends upon the solder strip, in alinement with the receptive die, the operation is as follows: Edge, $S^1$, passing edge, $S^{10}$, cuts the larger circle for the ring of solder, and further descending, part 1' depresses part 12 of the receptive die until part 12 is stopped by the studs 14. Before this occurs, however, the edges, $S^5$ and $S''$, have punched out the center of the solder disk, thereby making a ring from the disk. During the descent of the die, the yielding member, 7, thereof has been pushed up, as it were, by impinging upon the solder ring which is supported by the solid lower member, 11. More correctly stated, part 7 stands still during a portion of the movement of the die until the solder ring is cut through. The springs, 8, must not be strong enough to cause the part 7 to cut a ring from the solder. As soon as the ring has been cut from the sheet of solder, its outer portion is clamped between the part 1' of the upper die and the member 12 of the lower die. As the die 1 continues to descend it pushes the member 12 downwardly until the latter rests upon the stops 14. At this time the outer edge of the ring is below the beveled face of the member 11, and the spring-pressed member 7 impinges against the inner side of the ring, pressing the same upon said beveled face with sufficient force to conform the ring to the shape of the dies. As the die 1 ascends, the member 7 remains stationary for a short period or until the inner shoulder thereof is engaged by the member 5 and is raised thereby. While thus remaining in contact with the ring until the other members of the die have receded therefrom it prevents the ring from being displaced during the retraction of the upper die. The waste, 77, of the solder ring, would remain within the die member, 11, and clog the action of the punch, 5, were some means not provided for removing it from the receptive die. The stationary plate, 16, that underlies the carrier, 19, is provided with a circular hole 78, positioned to register with the solder-punching die, 1. We have conceived the idea of expelling each waste core, 77, by a puff of compressed air directed downwardly through the die to blow the core through the hole 78 in the plate, 16. A shelf or chute, 78', directs the waste into a receptacle (not shown). To accomplish this, we have devised a very simple and efficient mechanism for compressing the air just when it is required, so that no valves are necessary, and a minimum of power is absorbed for compressing the air. Before describing said mechanism, however, we will proceed to describe the cap-hemming operation, and that the further steps thereof may be fully understood, reference should be made to Fig. 11 as well as to Figs. 8 and 9.

The carrier, 19, being turned in the direction of the arrow (Fig. 3) carries the ring of solder from the first-acting plunger-die, 1, to the second plunger-die, 2, which is alined with the center of a cap held by the arms, 53. The parts of die, 2, are sectionally represented in Figs. 8 and 9. In Fig. 8, a portion of one of the arms, 53, is shown, the leader touching the end thereof. The die member, 4, here shown, is that shown in Figs. 6 and 7 already described. But it is caused to act in a different manner, as presently explained. The plunger-die member, 2, comprises two elements, one for suddenly snapping the can-cap down upon the solder ring, and the other, for flanging the solder ring preliminary to crimping it over the edge of the cap, in which latter operation the receptive die member is also involved. The die member, 2, is provided with a peripheral concave beveled surface, 2', that will fit the inclined flange, 9', of a cap, 9. A spring-pressed downwardly-projecting pin, 82, is mounted in the center of the part, 2, its stem passing through a threaded guide, 83, and its head, 82' being engaged by a spring, 84. The operation is as follows: There is just space within the flanges, 53', of the closed arms, 53, to let the die, 2, descend therebetween, which occurs before said arms are separated by the means heretofore described. Thus the pin, 82, strikes the central vent-hole in the cap, and the further descent of the die compresses the spring, 84. Before said spring is fully compressed, or before the die touches the cap, the arms, 53, are separated, thus withdrawing their support from the cap (which is prevented from slipping laterally by the pin) and the spring instantly causes the pin to snap the cap down upon the solder ring. The further descent of the die, 2, brings its beveled surface, 2', into contact with the cap flange, and pushes down the cap and the receptive die member, 11, a short distance below the upper edge of the inclosing member, 12. Were the member 11 solidly supported, as during the first operation (Fig. 6) it obviously could not descend; but the stationary plate, 16, beneath the carrier, is provided with an annular groove, 85, to register with the second die, 2, and in said groove is loosely fitted a ring, 86, that is pressed up by springs, 87, against the lower surface of the carrier, and beneath the outer portion, 4, of the die member, 11. By this means, said die member is made depressible by the active die, 2, and is raised to normal as the die moves up. The diameter of die, 2, is slightly less than the bore of die member, 12, and as part 2 descends, the top of part 12 turns the periphery of the solder ring straight up, as shown in Fig. 9; the flange on said ring now lying between said die members. The member, 2, now ascends. Following these operations, the carrier is advanced another step, or quarter turn, and thus conveys the almost hemmed cap beneath the third plunger die, 3. See Fig. 5, where this die is shown in elevated position, and Fig. 10, where it is shown fully depressed. As shown in Fig. 5 this die is similar in construction to the second plunger die, 2. It is provided with a central spring-pressed pin, 88. Its lower edge is provided with a depending flange, 3', within which is an inclined or beveled surface, 3'', adapted when depressed to turn the solder flange inward and downward upon the cap, as shown accomplished in Fig. 10. It will be observed that this die is so large in diameter that it will impinge on the receptive die member, 12, which is normally unyielding. To allow the part, 12, to be depressed by the die, 3, the fixed plate, 16, beneath the carrier, is provided at this point with a second depressible ring, 89, sunk in a groove therein and upheld by springs, 90. In this case, however, the ring, 89, is arranged beneath the ring, 15, previously mentioned in describing the dies. Ring, 15, supports the stops, 14, but is also depressible; hence when the die, 3, descends, it depresses the die member, 12, the stops, 14, and both rings, 15 and 89. The cap is now hemmed, and the die ascends. The springs, 90, push up the ring, 89, flush with the surface of the plate, 16, and the carrier makes its next quarter turn, bringing the receptive die and the cap, above the outlet, 81', of a compressed-air duct, 81, formed in the stationary plate, 16, for admitting the pressure into the receptive dies in rotation. The relative position of the air-outlet, 81', is shown in Fig. 11 and also in Fig. 4. As soon as the die holding the hemmed cap comes to rest, the air within said die is compressed, by means to be described, and, as the cap tightly closes the top of the die, it will be suddenly dislodged and thrown up, into a discharge-chute, 91. The chute, 91, may be provided with a finger, 92, so positioned that it will be struck by the upper edge of the cap as the cap flies out; thus the cap will be deflected downwardly and cannot be thrown out of the chute.

The air-compressor may be of any suitable construction. As shown in Figs. 1 and 3, it comprises a cylinder, 93, rigidly secured to plate, 16, and a piston in said cylinder and actuated by a finger, 95, carried by the plunger-head, 20. The operation of the parts will be understood from the following description of a separate air compressor which supplies the pressure for expelling the solder waste from the receptive dies. This compressor is preferably constructed as follows: The air cylinder, 96, is rigidly secured to the top of the plunger-head, 20. The compressed air escapes through a tube, 97, and a hole, 98, drilled through the die and its screw, 6. The piston, 99, is recessed as shown to inclose a tube, 97, and is pressed down by a spring, 100. The piston-rod, 101, is provided near its upper end with a collar, 102. A bracket, 103, is rigidly secured to the frame of the machine and has pivoted thereon a dog, 104, the upper end of which slips under said collar, 102, as soon as the plunger, 20, reaches its highest position. Said dog is formed with a projection, 104'; and a tripper, 105, is rigidly held by the cylinder, 96, in such position that the tripper, 105, will engage said projection, 104', of the dog, 104, and will disengage the latter from the collar, 102, during the last portion of the down stroke of the plunger die. Until this occurs, however, the dog, 104, remains under said collar and thereby holds up the piston, 99, while the cylinder, 96, is carried down by the plunger. The piston, 99, being held stationary, the downward motion of the cylinder will cause an inrush of the air through the duct, 98, and as the die plunger completes its downward stroke, the tripper, 105, on cylinder, 96, will engage detent, 104 and free the piston, 99. Instantly the spring, 100, will drive the plunger downward, thereby quickly forcing the air from the cylinder and against the small disk which has been punched from the solder strip by the die member, 5. The upward movement of the die plunger carries the parts up to the point where the dog reëngages the piston-rod collar. The efficiency of this device is insured by the fact that at the instant of the expulsion of the air through the duct, 98, the plunger die closes the opening of the receptive die, thereby preventing the escape of the air from above the disk that is to be expelled. As before stated, the waste or disks so expelled fall upon the chute, 78'.

The lower air-compressor, that expels the hemmed caps, is constructed and operated, in a manner similar to that just described.

The intermittent gear by which the die-carrier, 19, is turned, is in a preferred form illustrated in Figs. 5 and 12. As shown, it consists of a modified "Geneva movement". The driving member, 43, is keyed on the shaft, 40, geared to the power-shaft, and comprises a roll stud 108, carried by its lower portion, 44. The driven member is the star-wheel, 109, keyed upon the carrier shaft, 23. The construction here shown gives one quarter of a revolution to the carrier for each revolution of shaft, 40.

The entire mechanism is started and stopped at the will of the operator, either by shifting a belt on fast and loose pulleys, or by means of a clutch. In the drawings a clutch, 110, is shown, the same being controlled by a pedal, 111, through the medium of a chain, 112, passing over a pulley, 113, and connected to an arm, 114, on rock-shaft, 115. The clutch represented is a clutch of common form.

A part which has not been mentioned is a segmental plate, 116, shown in Figs. 3 and 5. This plate is held by clips, 117, slightly above one half of the carrier, 19, opposite the solder-guideway, 30. Its function is to prevent the dislodgment of the caps from the lower dies while they are carried from the second position to the blowing-out position, adjacent to the discharge chute.

The operation of the machine when supplied with solder and caps is as follows: Supposing the plunger-head, 20, to be in the act of returning or rising, the cap-receiving arms, 53, will be in contact and one of the caps will be held thereby. The solder strip, 25, is stopped before the die, 1, strikes it; the die members, 1, 5, 10, and 11, punch a ring of solder from said strip, and die member, 7, presses the ring into the sectional form shown in Fig. 7, forming thereon an annular flange, adapted to receive the cap flange, 9'. In these operations the receptive die members, 10, 11, and 12, take part. Before the die, 1, rises, a blast of air from the compressor, 96, passes through the duct, 98, therein and blows down the solder core, 77, through the opening, 78, in the plate, 16. The die plunger rises and the carrier, 19, is turned 90 degrees in the direction of the arrow bringing the ring of solder beneath the closed fingers 53. The die, 2, with its center-pin, 82, now descends, the pin moves against the cap, 9, the spring, 84, yields, and the pins, 75, carried by the plunger-head, 20, engage the pins, 72, on said arms, thereby turning the latter on their pivots and letting the spring, 84, snap the cap down upon the flanged solder ring. The further descent of die, 2, strikes up a second flange upon the solder ring, as shown in Fig. 9. Said die rises, the carrier turns, and the cap is carried beneath the finishing die, 3, which descends and its concave beveled surface presses the solder-flange down upon the periphery of the cap, as shown. The die rises, and the carrier brings the hemmed cap to a point above the compressed-air outlet, 81', in plate, 16. The air compressed in cylinder 93 at the proper time, blows the cap upwardly and it falls into the discharge chute, 91.

It will be understood that a fresh cap is dropped on to the carrier, 19, during each stroke of the active dies, and therefore, a hemmed cap is discharged at each stroke thereof, making an output of four hemmed caps for each revolution of the carrier. During the upward stroke of the plunger-head and the movement of cam, 70, a fresh cap is released by the stop, 55, and slides onto the arms, 53.

It will be observed that the plunger-head, 20, is provided with a downwardly extending stud, 118, which is longer than the plunger dies, 1, 2, and 3. When the plunger descends, the stud, 118, is received by a fitting hole, 119, drilled in the carrier, 19. There are four of these holes in the carrier, disposed quartering. The stud, 118, is slightly rounded or tapered upon its end, and at each down stroke of the plunger, it is inserted in one of the holes, 119, in the carrier. Thus the accurate alinement of the receptive dies with the plunger-dies is insured, irrespective of the slightly irregular action of the intermittent gearing when it becomes worn.

When larger or smaller caps are to be hemmed, the following changes of adjustment are made: First, the dies, both upper and lower, are replaced by larger or smaller dies of the right size. Second, the crank-pin, 45, of the solder-feeding rods, 46, 47 is shifted away from or toward the center of the slotted wheel, 44. Third, the push-finger, 54, is so adjusted, by moving lug, 59, in slot, 56', that it will engage the cap next above the cap that is held arrested by the cap-stop, 55. The alteration of the arc of rotation of the feeding-rolls, 28, 32, increases or decreases the feed of the solder-strip to correspond with the diameter of the solder ring, to be punched.

We wish it understood that we do not limit our invention to the constructions and combinations of parts herein shown and described, as numerous modifications will occur to persons skilled in the art.

Having thus described our invention we claim as new and desire to secure by Letters Patent:

1. In a cap hemming machine, a plurality of active dies having different functions, in combination with a rotative carrier, a plurality of receptive dies held by said carrier, each comprising a plurality of members and having different functions in different positions, and means to intermittently turn said carrier to stop each said receptive die below each of said active dies in sequence; substantially as described.

2. In a cap hemming machine, a plurality of active dies having different functions, in combination with a rotative carrier, a plurality of receptive dies held by said carrier and having different functions in different positions, means to intermittently turn said carrier to stop each said receptive die below each of said active dies in sequence, and means for intermittently feeding sheet solder across and beneath one of said active dies; substantially as described.

3. In a can-cap hemmer, a shiftable receptive die, means for intermittently feeding sheet solder across said die in one position thereof and means for placing a cap upon said die in another position thereof, substantially as described.

4. In a can-cap hemmer, a shiftable receptive die, adapted to form a ring of solder from a strip, means for intermittently feeding strip solder across said die, in one position thereof, the ring of solder remaining upon the die, and means for placing a cap upon said ring in another position of the die, substantially as described.

5. In a can-cap hemmer, a shiftable receptive die, adapted to form a ring of solder from a strip, and to carry the ring of solder to a second position; means for depositing a cap on said ring in said position of the die; and means for hemming the cap in a third position of the die, substantially as described.

6. In a can-cap hemmer, a shiftable receptive die, adapted to form a ring of solder from a strip and to carry said ring to a second position; means for depositing a cap upon said ring in said second position; means for hemming the cap in a third position of the die; and means for expelling the cap in a fourth position of the die, substantially as described.

7. In a can-cap hemmer, a step-by-step rotatable receptive die, adapted to form a ring of solder from a strip and to carry said ring to a second position; means for depositing a cap upon said ring in said second position; means for hemming the cap in a third position of the die; and means for expelling the cap in a fourth position of the die, substantially as described.

8. In a can-cap hemmer, a rotative carrier, a plunger movable toward and from the carrier, said parts being equipped with unequal numbers of coacting dies; means for feeding strip solder with reference to one of the plunger dies, and means for feeding caps from a chute to another of said dies, substantially as described.

9. In a cap hemmer, a rotative carrier, a plunger movable toward and from the carrier, said parts being equipped with unequal numbers of coacting dies; means for feeding strip solder with reference to one of the plunger dies, means for feeding caps from a chute to another of said dies and means for presenting the carrier dies in sequence to the plunger dies, substantially as described.

10. In a can cap hemmer, a rotative carrier, a plunger movable toward and from the carrier, said parts being equipped with unequal numbers of coacting solder-cutting and hemming dies; means for feeding strip solder with reference to one of the plunger dies, and means for feeding caps with reference to another of said dies, substantially as described.

11. In a cap-hemming machine, an intermittently rotative die-holder and carrier, an open-bottomed die member carried thereby, a plate beneath said carrier, and a compressed-air duct through said plate in position to register with said open-bottomed die member in one position of the latter, substantially as described.

12. In a cap-hemming machine, an intermittently rotative die holder and carrier, open-bottomed die members carried thereby, a compressed-air duct having its mouth in position to register with said open-bottomed die members in sequence, and means for supplying compressed air to said duct, substantially as described.

13. In a cap-hemming machine, an active die provided with an air duct, in combination with a receptive die, said dies being adapted to punch a disk of solder from a ring; and means for admitting compressed air through said duct for expelling a disk of solder from the receptive die, substantially as described.

14. In a cap-hemming machine, a rotary hemming-die carrier, in combination with a cap-feeding device comprising a chute, a movable cap-stop, a second movable cap-stop located above the first, and means whereby the rotation of said die carrier will so move said stops that the first will release a cap while the second stops the following cap, substantially as described.

15. In a cap-hemming machine, a cap and die-carrier, a receptive die carried thereby, a chute for delivering caps to said carrier, a cap holding device that receives a cap from said chute, an active die provided with a yielding device for preventing the cap from slipping, and means for causing said cap holding device to release the cap while the cap is engaged by said yielding device, whereby the cap is deposited upon said receptive die, substantially as described.

16. In a cap-hemming machine, a cap and die-carrier, a receptive die carried thereby and holding a solder ring, a cap-holding device, an active die provided with a yielding device for preventing the cap from slipping, and means for causing said cap-holding device to release the cap while the latter is engaged by said yielding device whereby the cap is deposited upon said solder-ring, substantially as described.

17. In a cap-hemming machine, a cap and die-carrier, a receptive die carried thereby and holding a solder-ring, a chute for delivering caps to said carrier, a cap-holding device that receives a cap from said chute, an active die provided with a yielding device for preventing the cap from slipping, and means for causing said cap-holding device to release the cap while the latter is engaged by said yielding device, whereby the cap is deposited upon said solder-ring, substantially as described.

18. In a cap-hemming machine a die carrier, a receptive die carried thereby and adapted to hold a solder-ring, a cap-holding device above the carrier, an active die above said device, an active die provided with a center-pin adapted to enter a central depression in the held cap, and means for causing said holding device to release the cap while the cap is pressed upon by said center-pin, thereby depositing the cap upon the solder ring, substantially as described.

19. A pair of coöperating dies adapted to cut a ring of sheet solder from a strip, the active die being provided with a compressed-air duct, and means for admitting compressed air through said duct to expel the disk of solder from the other die, substantially as described.

20. In a cap hemming machine, a plunger, a die held thereby, an air-compressing member carried by the plunger, a fixed coöperating air-compressing member, and a duct leading from one of said members and passing through said die, for the purpose described.

21. In a cap hemming machine, a die holding plunger, a die holding carrier adjacent thereto, a receptive die in said carrier, an air-compressing member carried by said plunger, a fixed coöperating air-compressing member, and a duct leading from one of said members into said receptive die, for the purpose described.

22. In a cap hemming machine, a rotative carrier provided with four receptive dies arranged quartering, in combination with a plunger provided with three active dies arranged to coact simultaneously with said receptive dies, and means to turn said carrier whereby each receptive die will be brought into alinement with each active die in sequence, substantially as described.

23. In a cap hemming machine a rotative carrier provided with four receptive dies arranged quartering, in combination with a plunger provided with three active dies arranged to coact simultaneously with said receptive dies, means to turn said carrier whereby each receptive die will be brought into alinement with each active die in sequence, and means for forcing compressed air into the receptive die that is not engaged by said active dies during the upward stroke of the latter, substantially as described.

24. In a cap hemming machine a rotative carrier provided with four receptive dies arranged quartering, in combination with a plunger provided with an active die positioned to coact with each of said receptive dies, a cap-holder arranged in the path of said active die, means for opening the cap-holder, and means carried by the plunger for placing a cap upon said receptive die; said last named means engaging a cap before said holder is opened, substantially as described.

25. In a cap hemming machine, a plurality of receptive dies, and a carrier which stops said dies in four successive positions; in combination with a plurality of active dies alined with said dies, guides for a strip of sheet solder, traversing the path of one of the active dies, a cap holding and releasing device arranged in the path of the next active die, means for placing a cap upon the receptive die in its second position, and means for hemming the cap in its third position, substantially as described.

26. In a cap hemming machine, a continuously rotated shaft, a strip solder feeding mechanism actuated from said shaft, a carrier shaft intermittently rotated by said shaft, a die carrier turned by said carrier shaft, and cap feeding mechanism actuated from the carrier shaft, substantially as described.

27. In a cap hemming machine, a continuously rotated shaft, an adjustable strip solder feeding mechanism actuated from said shaft, a carrier shaft intermittently rotated by said shaft, a die carrier turned by said carrier shaft, and cap feeding mechanism actuated from the carrier shaft, substantially as described.

28. In a cap hemming machine, a continuously rotated shaft, an intermittent gear driving member and a slotted member both actuated by said shaft, a carrier-shaft carrying a driven gear member, actuated by the said driving member, and a strip solder feeding mechanism comprising drawing-in rolls, drawing-out rolls, rock-arms and ratchets for turning the rolls, and connecting-rods extending from said rock-arms to a crank-pin adjustably held by said slotted member on the continuously rotated shaft, substantially as described.

29. In a can-cap hemmer, an inner and an outer coacting die, said inner die comprising an outer unyielding member, a normally yieldable member fitted therein, and an inner normally yieldable member, in combination with means for stopping and releasing said last named members, substantially as described.

30. In a can cap hemmer, a carrier, a die mounted in the carrier, said die comprising a stationary member and two relatively movable members, a fixed member beneath said carrier and normally holding said die members against movement, and means held by said fixed member for releasing said die members alternately in different positions of the die; substantially as described.

31. In a cap hemming machine, relatively stationary plunger dies and bed plate, in combination with a die carrier means for causing step by step movement to present the dies of the carrier to the plunger dies successively, the dies of said carrier comprising a plurality of parts, and said plunger dies and said bed plate being formed to coact with different parts of the carrier dies, in the different positions or relations thereof, substantially as described.

32. In a cap hemmer, a plurality of relatively fixed non-rotative reciprocating dies, in combination with a stationary element, an interposed rotary member, a plurality of receptive dies in said rotary member spaced to correspond to the first mentioned dies and exceeding the number thereof, said receptive dies each comprising a plurality of members, one stationary and the other longitudinally movable, the latter adapted for actuation by the reciprocating dies, and said stationary element being formed to permit relative longitudinal movement of the members of the receptive dies in one position of said rotary member, and to limit said movement, substantially as described.

33. In a cap hemmer, a plurality of relatively fixed non-rotative reciprocating dies, in combination with a stationary element, an interposed rotary member, a plurality of receptive dies in said rotary member spaced to correspond to the first mentioned dies and exceeding the number thereof, said receptive dies each comprising a plurality of members, one stationary and the other longitudinally movable, the latter adapted for actuation by the reciprocating dies, and said stationary element being formed to permit relative longitudinal movement of the members of the receptive dies in one position of said rotary member, substantially as described.

34. In a cap hemming machine, the combination of a rotative cap and die-carrier, means for turning it step by step, a receptive die held by said carrier, said receptive die comprising a plurality of relatively movable parts; an active die; a plate underlying said carrier and provided with a depressible spring-pressed ring, which when the receptive die stops thereover and the active die descends, will permit one of the movable die parts to be depressed by the active die; substantially as described.

35. In a cap hemming machine, the combination of a rotary cap and die-carrier, means for turning it step by step, a receptive die held by said carrier, said die comprising a plurality of relative movable parts; a plate beneath said carrier, said plate being provided with two depressible rings, alined with different stopping points of said receptive die, said rings being unequal in diameter; each of said rings permitting depression of one of said movable die parts but not permitting depression of the other part; whereby said receptive die will perform two different functions according to the position of the carrier, substantially as described.

36. In a can cap hemmer, a rotatable carrier, a fixed member arranged beneath said carrier, a die mounted in said carrier, said die comprising a stationary member supported by said carrier and two relatively movable members normally supported by said fixed member, and means carried by said fixed member for permitting different relative movements between said die members when in different positions; substantially as described.

37. In a can cap hemming machine, a cap and die carrier, a receptive die held thereby, a chute for delivering caps to said carrier, a cap stop comprising a pin normally extending through the bottom of said chute in the path of said caps, and means upon said cap and die carrier for depressing said pin to release a cap; substantially as described.

38. In a cap hemming machine, a rotary die carrier, in combination with a cap feeding chute for feeding caps to the dies on said carrier, a cap stop comprising a spring pressed pin normally extending through the bottom of said chute in the path of said caps, and means for depressing said pin to release a cap; substantially as described.

39. In a cap hemming machine, a cap and die carrier, and a receptive die carried thereby, in combination with a cap feeding device comprising a chute, a movable pin extending through the bottom of said chute and in the path of said caps, a spring pressed head carrying said pin, a frame supported by said head and above said chute, a push finger supported by said frame; and means upon said cap and die carrier for operating said cap feeding device to feed one cap at a time to said die; substantially as described.

40. In a cap hemming machine, a pair of coöperating dies adapted to cut a ring of sheet solder from a strip, an air duct in the active die, an air pump connected thereto, and means for actuating said air pump with each reciprocation of said active die to expel a disk of solder from the other die; substantially as described.

41. In a cap hemming machine, a receptive die, a plunger arranged above said die, a coöperating active die arranged in said plunger, an air duct through said active die, an air pump upon said plunger and communicating with said air duct, and means whereby the reciprocation of said plunger will actuate said pump to expel a disk of solder from said receptive die; substantially as described.

In testimony whereof, we have hereunto set our hands, this 23 day of August, 1906, in the presence of two subscribing witnesses.

VICTOR ODQUIST.
HALVOR HEYERDAHL LYCHE.

Witnesses:
CHARLES GILBERT HAWLEY,
M. SIMON.